United States Patent
Plazotta et al.

(10) Patent No.: US 8,973,689 B2
(45) Date of Patent: Mar. 10, 2015

(54) ELECTRICALLY OPERATED VEHICLE WITH A RIDER SADDLE

(75) Inventors: Bernhard Plazotta, Oberndorf (AT); Alexander Rauscher, Schalchen (AT)

(73) Assignee: KTM Sportmotorcycle AG, Mattighofen (AT)

( * ) Notice: Subject to any disclaimer, the term of this patent is extended or adjusted under 35 U.S.C. 154(b) by 925 days.

(21) Appl. No.: 12/459,808

(22) Filed: Jul. 8, 2009

(65) Prior Publication Data
US 2010/0018787 A1    Jan. 28, 2010

(30) Foreign Application Priority Data

Jul. 8, 2008  (DE) .......................... 10 2008 032 044

(51) Int. Cl.
| | |
|---|---|
| *B62D 61/02* | (2006.01) |
| *B60K 1/00* | (2006.01) |
| *B60K 1/04* | (2006.01) |
| *B62K 11/04* | (2006.01) |
| *B60L 11/18* | (2006.01) |
| *B62M 7/02* | (2006.01) |

(52) U.S. Cl.
CPC . *B62K 11/04* (2013.01); *B60K 1/04* (2013.01); *B60L 11/18* (2013.01); *B60L 11/1877* (2013.01); *B60L 2200/12* (2013.01); *B60Y 2200/12* (2013.01); *B62K 2204/00* (2013.01); *B62K 2208/00* (2013.01); *B62M 7/02* (2013.01); *Y02T 10/70* (2013.01); *Y02T 10/7005* (2013.01); *Y02T 10/705* (2013.01)
USPC ........ 180/65.1; 180/220; 180/231; 180/65.51

(58) Field of Classification Search
CPC ................. B62M 7/02; B60K 7/0007; B60K 2007/0046; B60K 2007/0061; B60K 5/04; B60K 5/12; B60K 1/04; B62K 2202/00; B62K 2208/00; B62K 2204/00; B62K 17/00
USPC ................ 180/65.1, 220, 231, 291, 292, 297
See application file for complete search history.

(56) References Cited

U.S. PATENT DOCUMENTS

| | | | | |
|---|---|---|---|---|
| 675,390 | A | * | 6/1901 | Keating .......................... 429/99 |
| 4,397,365 | A | * | 8/1983 | Harbe et al. .................. 180/68.5 |
| 4,406,342 | A | * | 9/1983 | Lacroix ......................... 180/220 |

(Continued)

FOREIGN PATENT DOCUMENTS

| | | |
|---|---|---|
| DE | 42 01 207 A1 | 7/1993 |
| DE | 603 00 636 T2 | 5/2006 |

(Continued)

*Primary Examiner* — Jeffrey J Restifo
*Assistant Examiner* — Travis Coolman
(74) *Attorney, Agent, or Firm* — Rod D. Baker (57) ABSTRACT

An electrically powered vehicle, for example a motorcycle. Disclosed is a vehicle (1) having a rider saddle (7) and a vehicle frame (10) having two frame profiles (11) extending up to a steering head (5) spaced away from each other and the vehicle (1) comprising at least one front wheel (3) guided at a front wheel guide (2) of the vehicle frame (10) and at least one rear wheel (17) guided at a rear wheel guide (13) and the vehicle having a electrically operated drive motor (30) as well as an electrical energy storage device (16) and a drive motor controller (41) and that between the drive motor (30) and a driving wheel a drive train is provided and that the energy storage device (16) is mountable between the frame profiles (11) above the drive motor (30) and the energy storage device (16) is releasably defined at a drive unit (28) mounting the drive motor (30).

19 Claims, 5 Drawing Sheets

(56) References Cited

U.S. PATENT DOCUMENTS

| | | | |
|---|---|---|---|
| 5,036,938 A * | 8/1991 | Blount et al. | 180/208 |
| 5,197,559 A * | 3/1993 | Garin et al. | 180/65.1 |
| 5,207,288 A * | 5/1993 | Ono | 180/220 |
| 5,435,035 A * | 7/1995 | Fujimoto et al. | 15/49.1 |
| 5,501,292 A * | 3/1996 | Kawashima et al. | 180/220 |
| 5,522,734 A * | 6/1996 | Goertzen | 439/500 |
| 5,552,988 A * | 9/1996 | Kawaguchi et al. | 701/70 |
| 5,613,569 A * | 3/1997 | Sugioka et al. | 180/68.5 |
| 5,657,830 A * | 8/1997 | Kawashima et al. | 180/220 |
| 5,730,243 A * | 3/1998 | Koike et al. | 180/220 |
| 5,749,429 A * | 5/1998 | Yamauchi et al. | 180/206.4 |
| 5,845,727 A * | 12/1998 | Miyazawa et al. | 180/206.4 |
| 5,865,267 A * | 2/1999 | Mayer et al. | 180/206.5 |
| 5,909,781 A * | 6/1999 | Yonekawa et al. | 180/206.4 |
| 5,924,511 A * | 7/1999 | Takata | 180/206.2 |
| 5,941,333 A * | 8/1999 | Sun et al. | 180/206.4 |
| 6,073,717 A * | 6/2000 | Yamamoto et al. | 180/206.4 |
| 6,095,270 A * | 8/2000 | Ishikawa | 180/68.5 |
| 6,098,732 A * | 8/2000 | Romick et al. | 180/23 |
| 6,152,251 A * | 11/2000 | Nagai et al. | 180/220 |
| 6,269,898 B1 * | 8/2001 | Mayer et al. | 180/220 |
| 6,276,479 B1 * | 8/2001 | Suzuki et al. | 180/206.8 |
| 6,326,765 B1 * | 12/2001 | Hughes et al. | 320/104 |
| 6,341,660 B1 * | 1/2002 | Schiller | 180/220 |
| 6,450,282 B1 * | 9/2002 | Gogo et al. | 180/219 |
| 6,483,272 B1 * | 11/2002 | Terada et al. | 320/103 |
| 6,568,496 B1 * | 5/2003 | Huang | 180/220 |
| 6,679,345 B2 * | 1/2004 | Hirayama et al. | 180/65.31 |
| 6,691,813 B2 * | 2/2004 | Schless | 180/220 |
| 6,722,460 B2 * | 4/2004 | Yang et al. | 180/220 |
| 6,739,421 B1 * | 5/2004 | Miya | 180/220 |
| 6,832,660 B2 * | 12/2004 | Dodd | 180/220 |
| 6,837,325 B2 * | 1/2005 | Shimizu | 180/68.5 |
| 6,845,839 B2 * | 1/2005 | Chernoff et al. | 180/291 |
| 6,889,788 B2 * | 5/2005 | Hakamata et al. | 180/219 |
| 7,004,276 B2 * | 2/2006 | Iizuka et al. | 180/89.17 |
| 7,111,443 B2 * | 9/2006 | Anderson et al. | 56/10.8 |
| 7,255,191 B2 * | 8/2007 | Baldwin et al. | 180/220 |
| 7,392,870 B2 * | 7/2008 | Kojima et al. | 180/65.25 |
| 7,614,925 B2 * | 11/2009 | Boebel et al. | 440/6 |
| 7,617,894 B2 * | 11/2009 | Ozeki et al. | 180/65.21 |
| 8,429,885 B2 * | 4/2013 | Rosa et al. | 56/11.9 |
| 2009/0266042 A1 * | 10/2009 | Mooney et al. | 56/11.9 |
| 2010/0089671 A1 * | 4/2010 | Trunkenpolz | 180/65.23 |
| 2010/0275564 A1 * | 11/2010 | Baetica et al. | 56/11.9 |
| 2013/0199146 A1 * | 8/2013 | Rosa et al. | 56/10.2 R |

FOREIGN PATENT DOCUMENTS

| | | |
|---|---|---|
| DE | 10 2007 019 803 A1 | 11/2008 |
| EP | 1 092 826 A1 | 4/2001 |
| JP | 05-105147 A | 4/1993 |
| JP | 2004-210072 A | 7/2004 |
| WO | WO 2005/044602 A2 | 5/2005 |

\* cited by examiner

ELECTRICALLY OPERATED VEHICLE WITH A RIDER SADDLE

CROSS-REFERENCE TO RELATED APPLICATIONS

This application claims priority to German Patent Application No. DE 10 2008 032 044.7, filed on 8 Jul. 2008, the entirety of which is incorporated herein by reference.

BACKGROUND OF THE INVENTION

1. Field of the Invention

The present invention relates to electrically operated vehicles, particularly two-wheeled vehicles but including vehicles having more than two wheels, and specifically frame elements and a structural configuration for such vehicles.

2. Background Art

It is known in the art to provide multi-wheeled vehicles with electric motors for power and propulsion. Interest in electrically-powered vehicles, including but not limited to electrically powered motorcycles and scooters, is increasing due to the rising costs, and environmental impacts, of fossil-fuel-powered vehicles. Japanese patent reference JP 2004 210 072A discloses an electric motorcycle. This motorcycle has an electric drive motor, the output torque of which is shafted to the rear wheel of the motorcycle. An energy storage device in the form of batteries is arranged above the drive motor, i.e., spaced away from the drive unit including the electric drive motor.

Known from Japanese patent reference JP 05 065 085 A is an electrically powered motorcycle having an electric drive motor which transfers its output torque to the rear wheel via a drive chain. The electrical energy storage device, in the form of batteries, is disposed between two box-shaped frame profiles, that is, above the electric drive motor and spaced away there from.

Known from U.S. Pat. No. 5,501,292 B1 is an electrically operated motorcycle having a battery located between two lateral frame profiles, and connected to the steering head tube of the frame. The battery is arranged above the drive motor, spaced away there from. This patent seems also to disclose an embodiment, having batteries both above and below the drive motor, which communicates its drive energy via a drive train including a primary drive and a secondary drive to the rear wheel of the motorcycle. The primary drive in this arrangement is a CVT variator with which the translation ratio can be continually varied and featuring, at both the drive motor shaft and at the transmission input end, a pair of bevel gears which can be coupled into the torque transmission by means of a centrifugal clutch.

U.S. Pat. No. 5,657,830 A shows a generic vehicle arrangement with batteries provided to power the electric motor.

Known further from German Pat. No. DE 603 00 636 T2 is an electric vehicle having a battery assembly which can be defined on a saddle support of the vehicle. Serving as the drive motor is a drive assembly arranged in the rear wheel. The drive assembly is a wheel hub motor arranged physically separate from the battery assembly.

Known from German Patent Application No. DE 10 2007 019 803 A1 is a frame for a variable battery box characterized in that the battery box is disposed between frame tubes of the two-wheeler furnished therewith; further details regarding the arrangement of the battery box in relation to an electric motor appear to be lacking.

Known from international patent publication number WO 2005/044602 A2 is a frame structure of a two-wheeler with a battery tray which can be located between the frame struts.

Known further from German Pat. No. DE 42 01 207 A1 is an electrically powered two-wheeler featuring a battery box between two frame links, a drive motor being arranged separate from the battery box.

Electrically operated motorcycles as described above have an energy storage device which needs to be regularly recharged. For recharging, the energy storage device is connected to a charging device or the like, or, as an alternative, the discharged energy storage device can be removed from the vehicle and replaced by a freshly charged energy storage device or an energy storage device still having sufficient capacity.

With the known motorcycles as described hereinabove, an electric conducting connection needs to be unmade between the drive unit and the energy storage device. The connection may be in the form of a connecting cable; after the cable is disconnected, the discharged energy storage device is removed from the motorcycle. The removal process usually requires the application of a tool—which is likewise needed when the new energy storage device is fitted to the motorcycle, and the electric conducting connection between the drive unit and the energy storage device re-established.

Such connection-disconnection activity takes time and effort. Moreover, the existence of the electric conducting connection, typically in the form of a cable between the energy storage device and drive unit, also may constitute a safety and operating risk. Although a coded plug and socket unit provides polarization, any freely located or accessible electric wiring poses a risk of injury from the high voltages and currents that exist between the drive unit and the energy storage device on powerful motorcycles.

Also, when an electrically operated motorcycle is negotiating difficult terrain, the added possibility exists that the bike may topple, or one of its wheels lose grip in an unintended manner, causing damage to the electric cable connecting the drive unit and the energy storage device.

Furthermore, motorcycles as described have a complex configured drive train. To attain the desired driving power, the electric motor needs to achieve relatively high rotary speeds which have to be reduced in the primary drive of the drive train. For this purpose, a CVT transmission often is provided as the primary drive. Also known is to provide a chain drive, instead of a CVT transmission, as the primary drive. Both of these solutions have drawbacks because they occupy considerable space, especially in the longitudinal direction of the primary drive, due to the traction means often being in the form of a belt or chain. Additionally, this type of primary drive is a disadvantage for the dynamic performance of the vehicle fitted therewith, because longitudinal vibrations of the traction means may occur, thus consuming driving power in the primary drive. Moreover, these known systems may also cause a noise nuisance, and the extra compartment needed for the traction means also adds to the weight of the primary drive and thus of the vehicle as a whole; the latter being non-conducive to the wanted dynamic response of the vehicle.

With the foregoing as background, an object of the apparatus described hereinafter is to eliminate the described drawbacks by sophisticating the vehicle so that there are no longer exposed connecting leads between the energy storage device and the drive train. Also there is provided hereby an apparatus in which the drive train of the vehicle loses less energy than is the case with known, generic, electrically operated vehicles.

SUMMARY OF THE INVENTION

The present invention relates to a vehicle having a rider saddle and a vehicle frame having two frame profiles, spaced away from each other, extending up to a steering head. The vehicle includes at least one front wheel guided at a front wheel guide of the vehicle frame, and at least one rear wheel guided at a rear wheel guide. The vehicle has an electrically operated drive motor, as well as an electrical energy storage device and a drive motor controller. Between the drive motor and a driving wheel is a drive train, and the energy storage device is mountable between the frame profiles, above the drive motor.

BRIEF DESCRIPTION OF THE DRAWINGS

The invention will now be described with reference to the drawing wherein.

DESCRIPTION OF THE PREFERRED EMBODIMENTS

Best Mode for Practicing the Invention

The disclosed apparatus may be a single-track or two-wheeled vehicle having a front wheel and a rear wheel. Alternatively, it may also be a two-track vehicle having a front wheel and two rear wheels or two front wheels and one rear wheel.

The vehicle according to this disclosure has an electrically operated drive motor for propulsion, resulting in no exhaust gas from internal combustion. The energy for driving the vehicle is taken from an electrical energy storage device, and the drive motor controller serves to supply the electric drive motor with the electrical energy from the energy storage device as needed for the particular application.

To achieve this object the invention now comprises the features as recited in claim 1 appended hereto. Advantageous aspects thereof read from the further claims.

There is provided a vehicle having a rider saddle and a vehicle frame having two frame profiles, spaced away from each other and extending up to a steering head. The vehicle has at least one front wheel guided at a front wheel guide of the vehicle frame, and at least one rear wheel guided at a rear wheel guide. The vehicle has an electrically operated drive motor, as well as an electrical energy storage device and a drive motor controller. A drive train is provided between the drive motor and a driving wheel, and the energy storage device is mountable between the frame profiles above the drive motor. The energy storage device is releasably disposed at a drive unit mounting the drive motor.

There thus is disclosed an electrically operated vehicle wherein by means of the arrangement of the energy storage device and the drive unit, an electrically conducting connection is provided between the energy storage device and the drive unit, respectively. The connection is automatically achieved when fitting the energy storage device to the drive unit, without the user having to connect a wired plug and socket connector between the energy storage device and the drive unit. When the user removes the energy storage device from the drive unit, he thus automatically also terminates the electrical conducting connection between the energy storage device and drive unit, such that the electric conducting connection is disconnected before electrical conducting contacts between the energy storage device and the drive unit are accessible from the exterior of the apparatus. In reversely fitting (e.g., replacing) an energy storage device to the drive unit, the electric conducting connection is automatically established when fitting the energy storage device to the drive unit. For this purpose, for example, detent tangs complementary in shape and size, or the like, may be provided at the energy storage device and at the drive unit. Such mutually complementary tangs, or the like, permit locating the energy storage device at the drive unit in a single fitted position only, so that the electric conducting connection between the energy storage device and the drive unit cannot be made until electric conducting contacts at the energy storage device and drive unit are no longer freely accessible to the user from without.

This creates a quick-change system, since the user now no longer needs to worry about making the electric conducting connection between the energy storage device and the drive unit, because it is now necessarily made without requiring active user involvement specifically to establish the electrical connection.

When the vehicle provided for in accordance herewith is, for example, an all-terrain competition motorbike designed for cross-country sports or competition biking, disposing the energy storage device between the frame profiles also results in the energy storage device being protected (by the frame profiles) from damage from stones or the like on the ground should the rider along with the bike unintentionally topple. The frame profiles may be closed or also hollow in section, configured circular tubular, oval or box-shaped, and extend up to a steering head of the vehicle. The steering head includes steering head bearings for pivotally locating a front wheel guide at the vehicle.

Additionally, disposing the drive unit and the energy storage device within the frame profiles of the vehicle according to this disclosure results in the vehicle having very good driving and handling performance. The vehicle has a configuration in which its center of gravity is sited below the rider saddle within an accommodation compartment formed by the frame profiles. In his normal saddle seating position, for instance, in the region of a lowest location in the form of a hollow configured in the saddle, the rider (as viewed from the surface under the vehicle) is located by his center of gravity vertically above the center of gravity of the vehicle. This promotes dynamic handling of the vehicle about the yaw axis running through the center of gravity of the vehicle, with a low moment of inertia about this yaw axis.

As viewed in the forward direction of the vehicle, the drive unit preferably is located ahead of a support for the rear wheel guide of the vehicle.

In one further embodiment of the disclosed apparatus, there is provided at the drive unit and at the energy storage device a plug and socket connector which, in locating the energy storage device at the drive unit, produces an electrically conducting connection. Locating the energy storage device at the drive unit may involve fitting, during which the energy storage device is located at the drive unit by a detent tang connection as mentioned above, or some other quick-change connection in making an electric conducting connection. This location may also involve an action in which the energy storage device is already arranged at the drive unit, but that an electrically conducting connection not being made until, for example, there is detention between the energy storage device and the drive unit.

Another alternative embodiment of the apparatus provides that the drive unit has a first housing accommodating the drive motor and a transmission; in the embodiment, a plug or a socket for electrically connecting the energy storage device preferably is disposed at one side of the housing, facing the energy storage device. There may be provided a second housing for the energy storage device, a side of this housing facing the drive unit and having a plug or a socket for an electrical connection with the drive unit. Thus, a plug is provided at the first housing and a socket provided at the second housing or, alternatively, a socket is provided at the first housing and a plug at the second housing, resulting in a safe electrical contact between the energy storage device and the drive unit, respectively, and thereby in part defining the energy storage device at the drive unit. When disconnecting the energy storage device from the drive unit, their shared electric conducting connection is parted before electric contacts are accessible to the user. The energy storage device may be provided with a means which takes the electric contacts provided thereon out of circuit as soon as the physical connection between the energy storage device and the drive unit is terminated.

In yet another embodiment of the apparatus, the drive unit has a support for mounting a rear wheel guide of the vehicle. The rear wheel guide may be, for example, a rear wheel swing arm serving to guide a rear wheel of the vehicle, particularly its vertical "up-and-down" translational movement. The swing arm may include a swing arm fulcrum located within the first housing of the drive unit, resulting in a compact configuration of the vehicle in accordance with a disclosed advantage of this apparatus.

In yet another possible embodiment of the apparatus, the drive motor controller is arranged in the drive unit. The drive motor controller accordingly can be accommodated in the first housing, inaccessible to the user of the vehicle. This prevents accidental contact of the vehicle user with current-carrying components. This configuration also enables the first housing to be configured to cool the drive motor and the drive motor controller. A cooling configuration provides components of the housing in the form of cooling fins and the like, which heat up in a region of the vehicle favorably located in the stream of cooling air of the moving vehicle while, on the other hand, being well protected from becoming dirty or contacting the user of the vehicle when the vehicle is properly operated.

To achieve a speedy replacement of an energy storage device when empty (depleted) or near empty with a sufficiently or fully charged energy storage device, it is provided for in yet a further embodiment that the energy storage device and the drive unit are interconnectable by means of a quick-change coupling. The coupling does not require the use of a tool in making an electrically conducting connection between the energy storage device and the drive motor. This quick-change coupling may be a detent coupling, a self-locking coupling, a clamp coupling or the like, having, for example, polarization elements at the energy storage device and drive unit so that the energy storage device can be secured to the drive unit in one proper position only. The quick-change coupling automatically detents when fitting the energy storage device to the drive unit while simultaneously making an electrically conducting connection between the energy storage device and the drive motor.

In a further embodiment of the apparatus, a connecting device is provided at the first housing for connecting a charging device for supplying electrical energy to the energy storage device. This connecting device can be arranged at the first housing, for example, above a region exposed to debris thrown up by the driving wheel in the form of sludge, grit or the like. However, it is also provided for that instead of (or in addition to) the second housing, a connecting device is arranged for connecting the charging device, thus making it possible for the user to disconnect the energy storage device with the second housing from the drive unit. Such an action might be taken, for example, at the end of the day to permit charging the energy storage device while separated from the vehicle. Accordingly, the energy storage device can be charged both on the vehicle and separately from the vehicle.

In still another embodiment of this apparatus, the drive train may feature a single-stage, non-tractive primary drive between an output shaft of the drive motor and an output shaft of the drive unit. Such a configuration promotes a compact arrangement of the primary drive and thus, for a highly dynamic vehicle, eliminating a "lossy" complex transmission—as would be the case, for example, with a belt-traction stepless transmission situated between the output shaft of the electric drive motor and an input shaft of the transmission.

In the disclosed apparatus, the primary drive optionally but preferably includes a one-piece intermediate wheel featuring two sets of teeth, the first set of which meshes with teeth of the output shaft of the drive motor and the second set of which mates with teeth of the output shaft of the drive unit. This offers an advantage of an extremely compact configuration of the primary drive, since the two sets of teeth are provided at the intermediate-wheel, axially spaced away from each other. The longitudinal centerline of the intermediate wheel runs parallel to the longitudinal centerline of the output shaft of the electric drive motor and parallel to the output shaft of the drive unit. This achieves an extremely compact and cost-effective configuration, and eliminates the need for a centrifugal clutch (as commonly encountered on known types of electrically operated motorcycles). Further, this mode of configuring the meshed sets of teeth does away with traction means which would significantly add to the bulk required.

In yet a further embodiment, the drive train of the disclosed apparatus has a traction means disposed between an output shaft of the drive unit and a rear wheel. The transmission may be a chain or a belt, while the rear wheel may be, for example, a rear wheel of an electric-powered two-wheeler.

Optionally, the drive unit is provided at least in the region of the drive motor and the drive motor controller, and has cooling fins extending in the longitudinal direction of the drive unit and in the region of the drive motor controller; some portion or quantity of cooling fins run in the vertical direction, having a support for mounting a rear wheel guide through which the output shaft of the drive unit passes. Instead of, or in addition to, the cooling fins running longitudinally, radial cooling fins may be provided serving to cool the drive unit.

This results in the drive unit having, in the region of the drive motor controller, cooling fins running vertical which are open both to the top and to the bottom, thus forming a cooling fin block. A drilling may be defined through the cooling fin block, running transversely to the longitudinal direction of the drive unit, through which an axle may pass and with which the rear wheel swing arm is mountable. This arrangement promotes a compact yet functional integration, because it avoids a need for a separate face, at the vehicle frame, for mounting the rear wheel swing arm.

In still another possible embodiment of the apparatus, the drive unit may have a compartment closed off by a cover for accommodating the drive motor, and the output shaft of the drive motor is mountable by means of a rolling contact bearing in the cover. The cover may be provided with cooling fins. This offers a configuration which makes it possible, for example by a modular system, to achieve vehicles of substantially different power. Thus, one drive motor can now be replaced by a, for example, more powerful drive motor. This can be realized simply by—after having removed the cover and one of the gears mating with the intermediate-wheel at the output shaft of the electric drive motor—lifting the latter out of the first housing of the drive unit and replacing it by a drive motor of different power rating. In accordance with one advantageous embodiment of the apparatus, this can be done even with the drive unit fitted to the vehicle frame. Since the energy storage device is releasably defined at the drive unit, this can likewise be simply removed from the drive unit and replaced by another energy storage device having, for example, further battery cells. A more powerful vehicle in accordance with the invention thus becomes available.

It is also provided that the vehicle in accordance with the present disclosure is of a single track or two-wheeler type having just one front wheel and just one rear wheel, with a drive unit disposed between the frame profiles below the energy storage device. The vehicle preferably has a steering device functionally coupled to the front wheel guide, and the rear wheel is guided by means of a swing arm mounted in the drive unit. The two-wheeler vehicle in accordance herewith may thus be a motorcycle designed, for example, also for off-road deployment and is well-sprung to make it suitable for cross-country sports events.

On a vehicle in accordance with this disclosed apparatus, the energy storage device preferably is arranged below the rider saddle where it has sideways protection by the sideways-oriented frame profiles. The energy storage device thus has all-round protection from damage, even when the vehicle is negotiating rough terrain and after toppling in such an environment. Such a vehicle may feature, in addition to the already fitted energy storage device, a second energy storage device as a speedy replacement for the first energy storage device when discharged after lengthy use.

It is needed only to remove the rider saddle coupled, for example, by means of a detent or clamp-type connecting device to the vehicle frame, so that also the rider saddle can be removed without the aid of a tool. Once the rider saddle is removed, the energy storage device is freely accessible from above, and readily removable from the frame portion between the frame profiles (again without the aid of a tool). Inserting the adequately charged second energy storage device in the portion between the two frame profiles and locating it at the drive unit automatically ensures that the electric conducting connection is made between the drive unit and the energy storage device, here again without the aid of a tool. After refitting the rider saddle and, for example, locking it in place at the vehicle frame the vehicle is immediately ready for renewed use.

During vehicle use with the second energy storage device, the first energy storage device can be fully recharged to be made ready for operation as soon as the second energy storage device is empty, thus providing the vehicle with practically unlimited deployment capacity.

Figure 1:
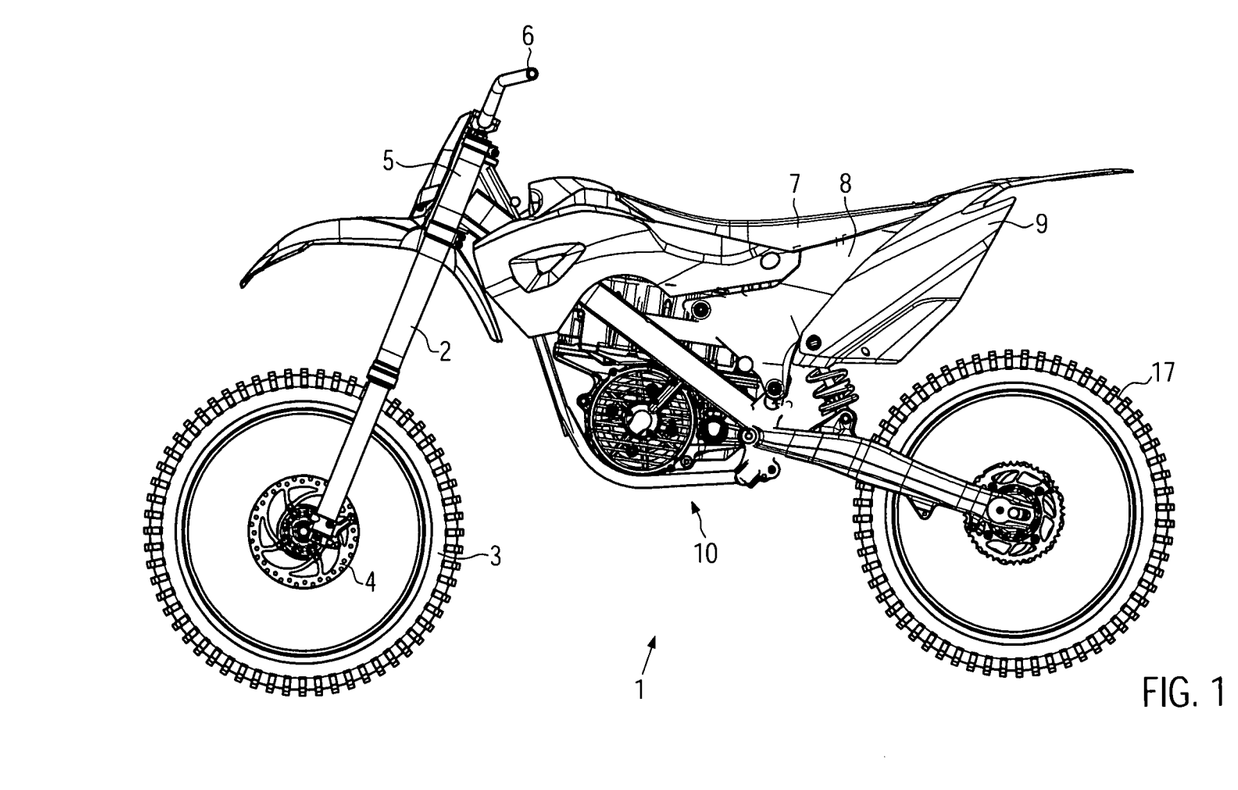
FIG. 1 is a side view of a vehicle in accordance with one embodiment of the present invention.

Referring now to FIG. 1 of the drawing, it is illustrated how the vehicle 1 is a two-wheeler in the form of a motorcycle designed for both on-road and off-road deployment. The vehicle 1 has a front wheel 3 rotatably mounted in a front wheel guide 2 taking the form of front wheel fork. Braking is provided by means of a brake disk 4 and a brake assembly (not shown). The front wheel guide 2 is mounted for rotation about a predetermined angle of rotation in a steering head 5. By means of a handlebar 6 in the form of a steering device, the front wheel guide 2 can be swiveled by the rider-user seated on a rider saddle 7.

The rider saddle 7 as well as the side fairing or trim element 8 and a rear frame assembly 9 can be releasably defined on a vehicle frame 10 formed by a multitude of frame profiles.

Figure 2:
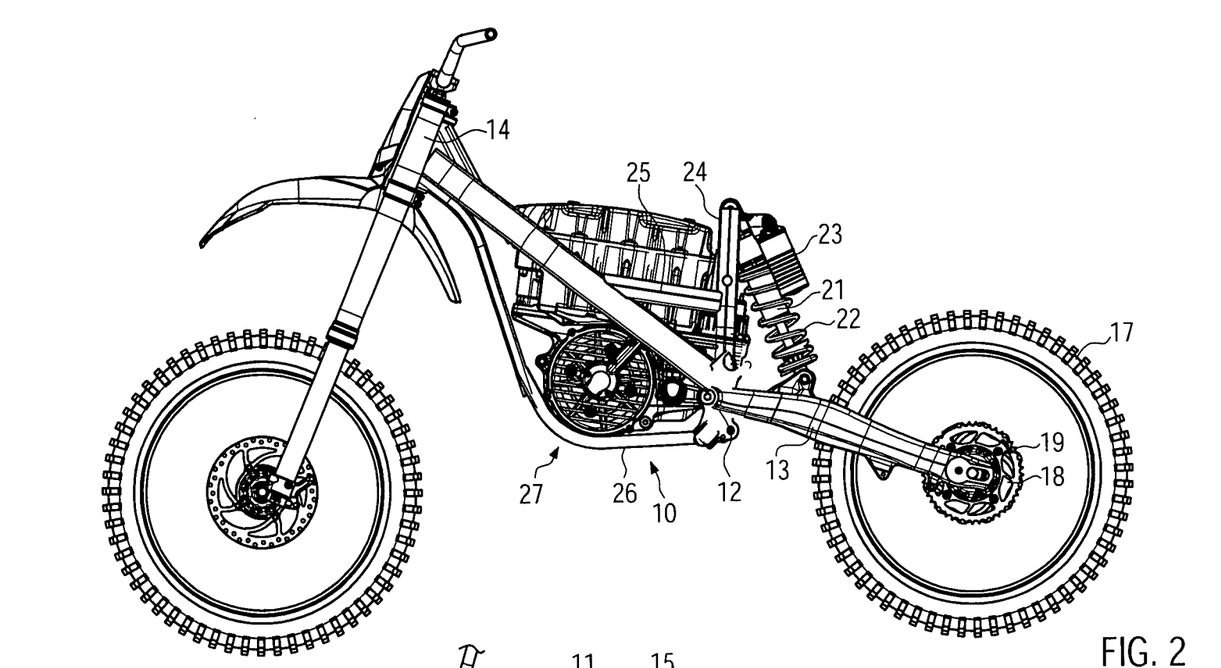
FIG. 2 is a view of the embodiment shown in FIG. 1, but with a few selected components removed for clarity of illustration.

Referring now to FIG. 2 of the drawing, in which the fairing 8 and rear frame assembly 9 (seen in FIG. 1) have been removed, there is illustrated how the vehicle frame 10 features, among other things, two (see also FIG. 3) frame profiles 11 extending in a spaced-away relationship from each other from a lower frame delta 12 mounting a rear wheel guide 13. The rear wheel guide 13 is in the form of a swing arm up to a steering head 5 which, in the embodiment as shown, is formed by a steering head tube 14 in thereby forming (due to their arrangement spaced away from each other) a compartment 15 for accommodating an energy storage device 16 shown in more detail in FIG. 4.

The frame profiles 11 may be tubular profiles of closed or open section, featuring high lightweight stiffness spaced away from each other to accommodate the energy storage device 16 between them. In that location, the device 16 is well protected from damage should the vehicle 1 topple.

Rotatably mounted in the rear wheel guide (swing arm 13) is a rear wheel 17 having in addition to a brake disk 18 a sprocket wheel 19 on which a transmission (not shown) in the form of a chain can be arranged, the chain engaging a chain sprocket 20 by means of which the vehicle 1 can be propelled.

As further evident from FIG. 2, the swing arm 13 is supported via a spring device 21 with an adjustable spring 22 and an adjustable damper element 23 on a support 24 of the vehicle frame 10 which in turn is supported via frame profiles 25 by the other frame profiles 11.

In this arrangement, the other frame profiles 25 run between the primary frame profiles 11 and the support 24 formed by two tubes upswept near vertical from the frame delta 12 so that, together with the frame profiles 11 slanting upswept from frame delta 12 in the direction of the steering head tube 14, they form the aforementioned compartment 15 for accommodating the energy storage device 16.

Figure 4A:
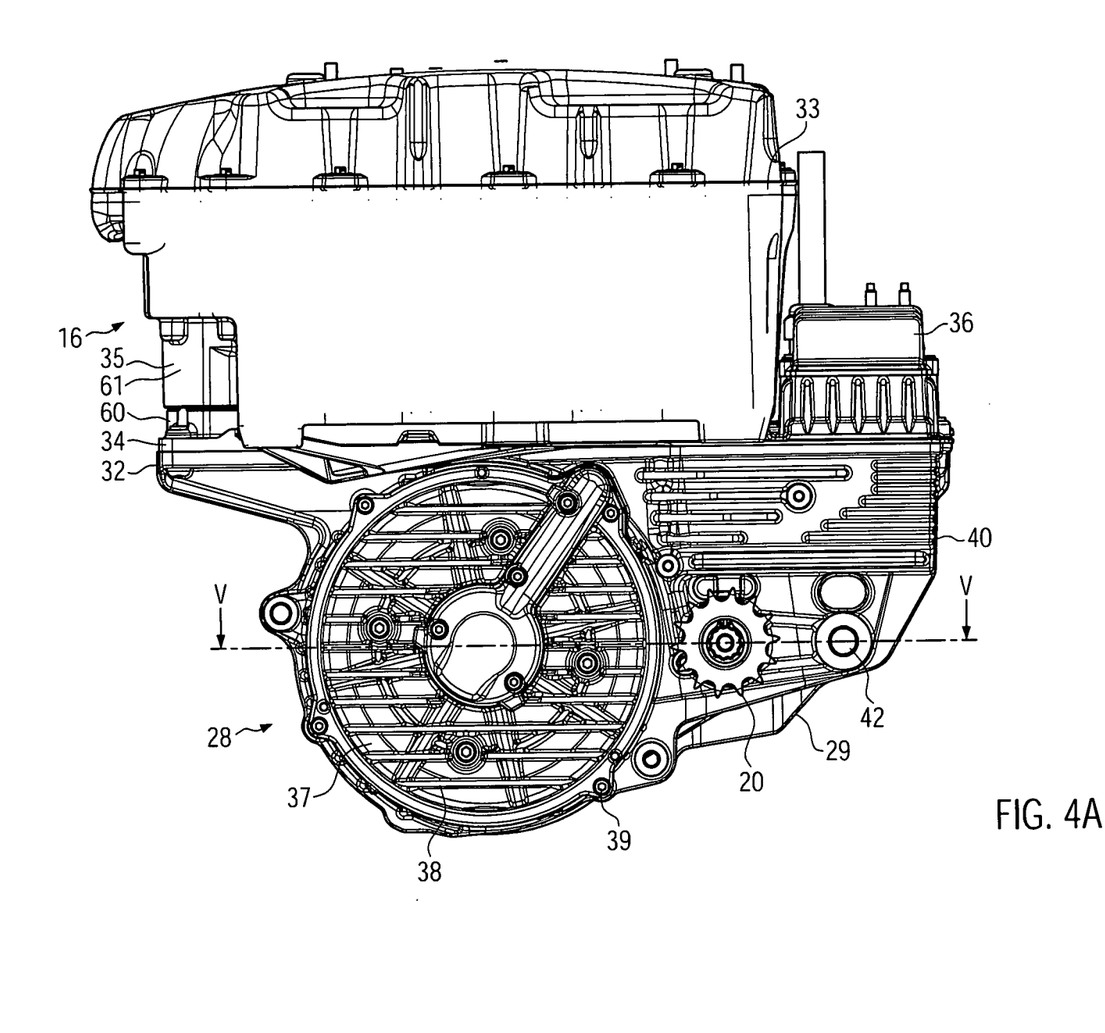
FIG. 4A is an enlarged view of the drive unit of the embodiment shown in FIG. 1, showing the energy storage device fitted thereto.

In addition, the vehicle frame 10 includes two further frame profiles in the form of bracings or frame trusses 26 extending mainly from the frame delta 12 and curved in the direction of the steering head tube 14, such that they initially run more or less horizontal from the frame delta 12 to then continue up to the steering head tube 14 (similar to an "S" shape or arrangement). These bracings 26 form together with the further frame profiles as aforementioned a compartment 27 for accommodating a drive unit 28 shown in more detail in FIG. 4.

Figure 5:
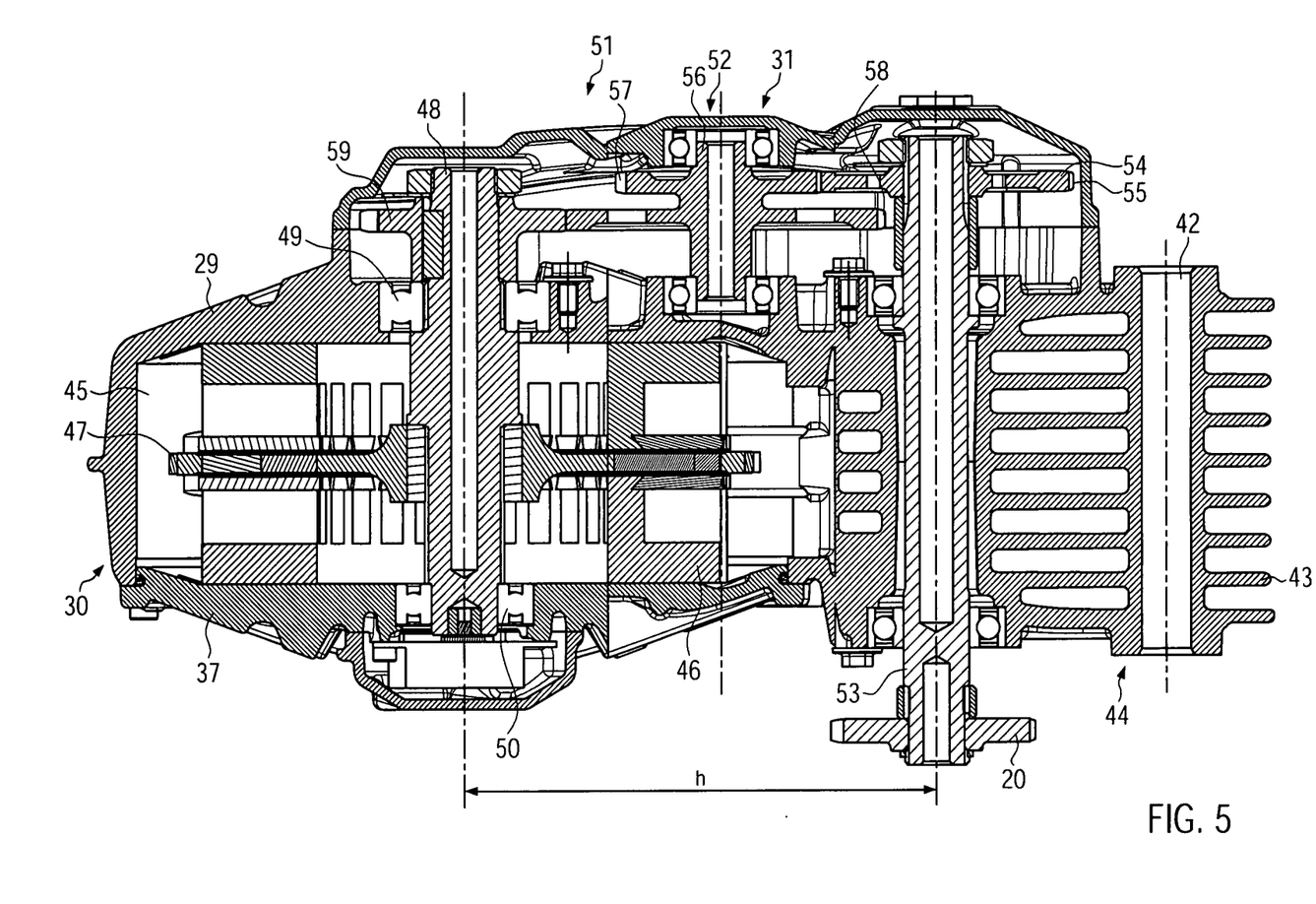
FIG. 5 is a sectional view of the drive unit shown in FIG. 4, taken along the section line V-V.

The drive unit 28 has a first housing 29 in which an electric drive motor 30 and a transmission 31 are located as shown in more detail in FIG. 5. The first housing 29 is topped by a connecting surface 32 for mounting the energy storage device 16. The energy storage device 16 preferably has a second housing 33 in which a multitude of rechargeable batteries is arranged. The mounting of the energy storage device 16 at the drive unit 28 is arranged so that, when locating the energy storage device 16 at the drive unit 28, an electrically conducting connection is automatically made between the energy storage device 16 and the drive unit 28. This is accomplished without the user of the vehicle 1 coming into contact with live or current carrying components of the combination of the drive unit 28 with the energy storage device 16.

Figure 4B:
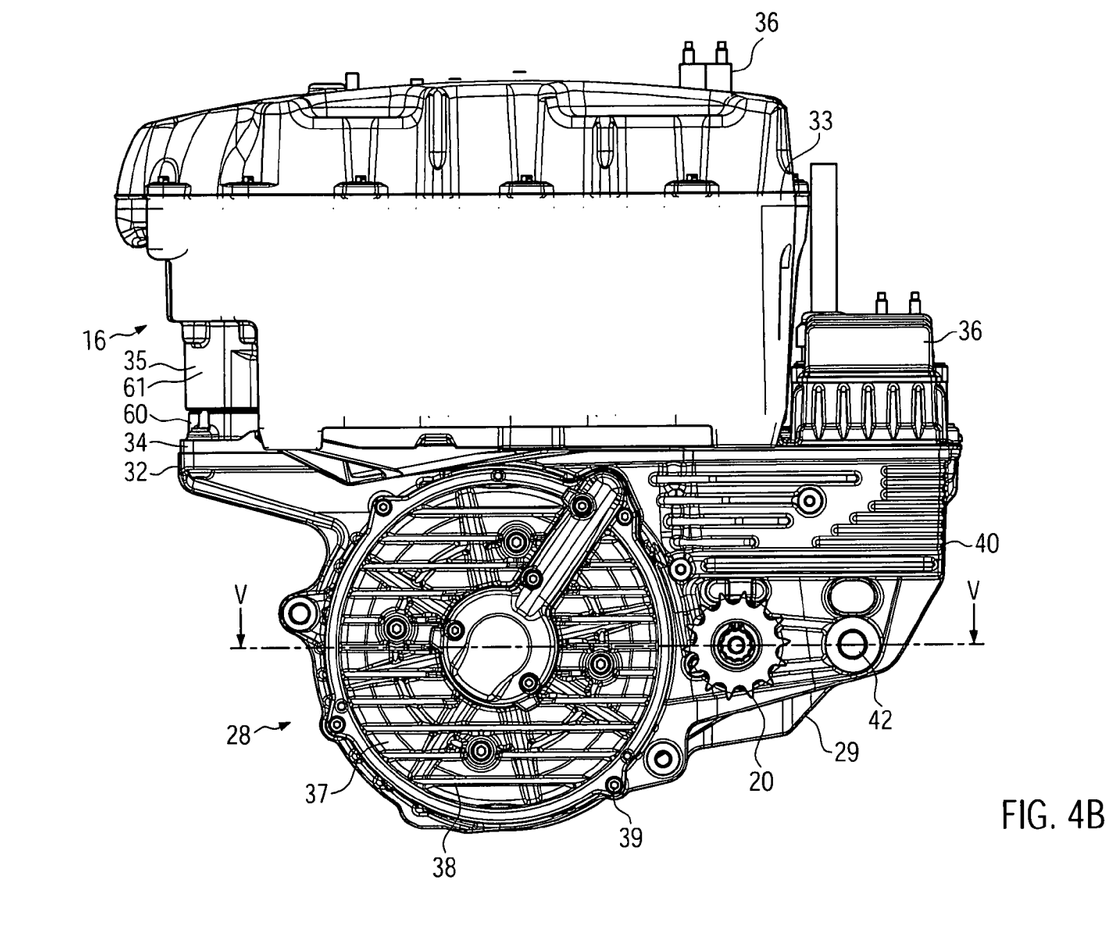
FIG. 4B is a view similar to that of FIG. 4A, showing a connector device provided at the energy storage device for connecting a charging device.

To obtain this advantage, and referring to FIGS. 4 and 5, there is provided at the connecting surface 32 and a complementary connecting surface 34 of the energy storage device 16 a quick-change coupling device having detentable, self snap-acting or self locking or self clamping components for automatically detenting or clamping the first housing 29 to the second housing 33. This is done with a positive connection in the arrangement of the energy storage device 16 at the drive unit 28 without requiring the assistance of a tool. Mounting the energy storage device 16 at the drive unit 28 automatically makes an electric conducting connection between the energy storage device 16 and drive unit 28, a plug and socket connector 35 producing for this purpose the electric conducting connection between the energy storage device 16 and drive unit 28.

The plug and socket connector 35 in the embodiment as shown is configured such that the first housing 29 has a circular socket 60 with internal electric contacts and that this socket 60 can be latched to a plug 61, having complementary shape and size, on the second housing 33. This second plug 61 has internal electric contacts which can be physically coupled to the internal electric contacts of the socket 60, thereby providing the electrically conducting connection between the energy storage device 16 and the drive unit 28. No cable-connected device is needed for this purpose. In this arrangement, the plug and socket connector 35 thus is a quick-change coupling between the energy storage device 16 and the drive unit 28, and for locking the energy storage device 16 and the drive unit 28 in place for simple release without the need of a tool.

At the end portion of the first housing 29, opposite the plug and socket connector 35, there is provided a connecting device 36 via which the energy storage device 16 (even while fitted to the vehicle 1) can also be charged by means of a charging device.

Referring now to FIG. 4B, there is illustrated how a connecting device 36 for connecting a charging device can also be provided on the second housing 33, so that the user of the vehicle can also charge the energy storage device 16 when it is not fitted to the vehicle. This is an advantage, for example, when the user wishes to charge the energy storage device 16 while separated from the vehicle, such as overnight or when one energy storage device 16 is to be charged while another, second, energy storage device 16 is fitted onboard the vehicle.

The first housing 29 has a circular cover 37, preferably on which a first multitude of longitudinal cooling fins 38 is arranged, and which can be releasably secured to the first housing 29 by means of bolts 39. Configured in the region below the connecting device 36 on the first housing 29 is a portion featuring a second set of longitudinal cooling fins 40 serving to cool a drive motor controller (not shown) arranged within the first housing 29. The drive motor controller may be a device provided with electronic circuitry for controlling the power of the electric drive motor 30, such that the user of the vehicle 1 controls the drive energy applied to the electric drive motor 30 from the energy storage device 16 by means of an actuating device disposed at the handlebar 6.

The first housing 29 preferably is provided with a support 42 for locating an axle mounting the swing arm 13 in the first housing 29.

Referring again to FIG. 5, there is illustrated in more detail how the support 42 runs through a housing block 44 having vertical cooling fins 43. The vertical cooling fins 43 are arranged below the portion of the housing 29 provided with longitudinal cooling fins 40, so that these cooling fins 43 too, serve to cool the drive motor controller arranged within the first housing 29 and below the longitudinal cooling fins 40.

The electric drive motor 30, arranged within the first housing 29 in an accommodating compartment 45 formed therein, may be a brushless DC motor having a stator 46 mounted in the accommodating compartment 45 and a rotor 47 non-rotatably engaging a rotor shaft 48 mounted in the first housing 29 by a rolling contact bearing 49 and a further rolling contact bearing 50 arranged in the cover 37. However, it is just as suitable that the drive motor is a three-phase motor energized locally or remotely.

A drive train 51 includes a single-stage, tractionless primary drive 52 between the rotor shaft or output shaft 48 of the electric drive motor 30 and an output shaft 53 of the drive unit 28. Non-rotatably secured to the output shaft 53 and rotatably mounted in the first housing 29 is the aforementioned chain sprocket 20. At the end portion of the shaft 53 opposite the chain sprocket 20 a gearwheel 54 is non-rotatably secured to a set of teeth or "toothing" 55. The gearwheel 54 mates with an intermediate-wheel 56 configured as a double gearwheel and featuring two sets of teeth or "toothings" 57, 58.

The first toothing 57 has a smaller base diameter than that of the second toothing 58 in mating with the gearwheel 54 non-rotatably secured to the output shaft 53. The second toothing 58 mates with the gearwheel 59 non-rotatably secured to the rotor shaft 48, so that the rotary speed of the rotor shaft 48 is reduced via the double gearwheel or intermediate wheel 56 in the direction of the output shaft 53. This single-stage tractionless primary drive with the intermediate-wheel 56, as compared to a chain transmission or a belted CVT transmission, significantly improves efficiency in communicating the power from the electric drive motor 30 to the output shaft 53.

Additionally, the intermediate-wheel 56, when compared to the aforementioned traction transmissions, achieves a significantly more compact arrangement, as it enables the horizontal spacing distance h (FIG. 5) between the middle of the rotor shaft 48 and the middle of the output shaft 53 to be significantly minimized. Also, the primary drive with its intermediate-wheel 56 runs quieter than a primary drive working with a traction means.

Figure 3:
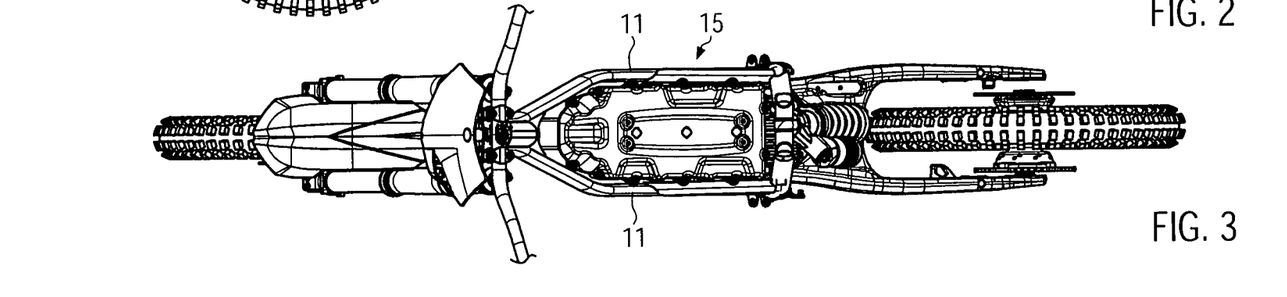
FIG. 3 is a top-down view of the embodiment shown in FIG. 2.

As particularly evident from FIG. 1 and FIG. 2, as well as FIG. 3, of the drawings, the energy storage device 16 preferably is arranged in the accommodating compartment 15 between the frame profiles 11 and frame profiles 25. After the rider of the vehicle 1 notes that the charging capacity of the batteries of the energy storage device 16 has significantly dropped, he can connect the energy storage device, via the connecting device 36, to a charging device to recharge the storage device (e.g., its bank of batteries). Alternatively, he may also, with just a few simple manipulations, replace the discharged energy storage device with a second sufficiently charged energy storage device.

To easily achieve this is, for example without requiring a tool, the user removes the rider saddle 7 (coupled to the vehicle frame 10 by releasable detents) from the vehicle frame 10 to access from above the energy storage device 16 located in the accommodating compartment 15 and, still without the need of a tool, releasing it from the drive unit 28 and lifting it out of the accommodating compartment 15. A sufficiently charged second energy storage device 16 can then be inserted from above into the accommodating compartment 15. The device 16 is connected to the drive unit 28 by means of the connecting surface 32, where it is locked in place. Doing this automatically ensures that the electric conducting connection is remade between the second energy storage device and the drive unit 28, without the need of having to release a cable connection between the drive unit and the energy storage device 16—both on removal as well as on reconnecting it when fitting the new energy storage device.

Removing the old energy storage device with its batteries drained automatically disconnects the electrically conducting connection, and inserting the new adequately charged energy storage device 16 into the accommodating compartment 15 (and locking it in place at the drive unit 28) automatically re-establishes the electric conducting connection between the energy storage device 16 and the drive unit 28. Then, all that remains to be done is to remount the rider saddle and lock it in place, and the vehicle 1 is ready for use. Although it is evident from the discussion above that the rider saddle 7 is simply latched to the vehicle frame 10, a releasable bolt fastener may be provided between the rider saddle 7 and the vehicle frame 10. Such a fastener may be in the form of a wing nut, releasable without the need of a tool, or a releasable bolt fastener with the assistance of an available tool.

It is understood that reference is made to the claims and to the drawing figures regarding any additional elements of the invention not detailed in the text above.

LIST OF REFERENCE NUMERALS 1 vehicle
2 front wheel guide
3 front wheel
4 brake disk
5 steering head
6 handlebar
7 rider saddle
8 fairing
9 rear frame assembly
10 vehicle frame
11 frame profiles
12 frame delta
13 rear wheel guide, swing arm
14 steering head tube
15 accommodating compartment
16 energy storage device
17 rear wheel
18 brake disk
19 sprocket wheel
20 chain sprocket
21 spring device
22 spring
23 damper element
24 support
25 frame profiles
26 bracings
27 accommodating compartment
28 drive unit
29 first housing
30 electric drive motor
31 transmission
32 connecting surface
33 second housing
34 connecting surface
35 plug and socket connector
36 connecting device
37 cover
38 cooling fins
39 bolts
40 cooling fins
41 drive motor controller
42 support
43 cooling fins
44 housing block
45 accommodating compartment
46 stator
47 rotor
48 rotor shaft
49 rolling contact bearing
50 rolling contact bearing
51 drive train
52 primary drive
53 output shaft
54 gearwheel
55 toothing
56 intermediate-wheel
57 toothing
58 toothing
59 gearwheel
60 socket
61 plug
h spacing Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A vehicle (1) having a rider saddle (7) and a vehicle frame (10) having two frame profiles (11) spaced from each other and extending up to a steering head (5), and the vehicle (1) further comprising:
   an electrically operated drive motor (30);
   an electrical energy storage device (16);
   a drive motor controller (41);
   a driving wheel;
   a plug and socket connection (35) on a drive unit (28) and on the energy storage device (16); and
   a drive train between the drive motor and the driving wheel;
   wherein the energy storage device (16) is mountable between the frame profiles (11) and above the drive motor (30), and wherein further the energy storage device (16) is removably fittable at and to the drive unit (28) mounting the drive motor (30) to automatically make a cableless electric conducting connection directly between the energy storage device (16) and the drive unit (28); whereby when the energy storage device (16) is fitted at and to the drive unit (28), the plug and socket connector provides the cableless electric conducting connection.

2. The vehicle (1) as set forth in claim 1, wherein the drive unit (28) comprises:
   a first housing (29) accommodating the drive motor (30); and
   a transmission (31); and
   further comprising a plug (61) or a socket (60), at one side of the housing (29) facing the energy storage device (16), for making the cableless electric conducting connection with the energy storage device.

3. The vehicle (1) as set forth in claim 2, further comprising a connecting device (36) on the first housing (29) for connecting a charging device for supplying electrical energy to the energy storage device (16).

4. The vehicle (1) as set forth in claim 3, further comprising a connecting device (36) on the second housing (33) for connecting a charging device for supplying electrical energy to the energy storage device (16).

5. The vehicle (1) as set forth in claim 2, further comprising:
   a second housing (33) accommodating the energy storage device (16); and a socket (60) or a plug (61), at a side of the housing and facing the drive unit (28), for making the cableless electric conducting connection with the drive unit (28).

6. The vehicle (1) as set forth in claim 5, further comprising a connecting device (36) on the second housing (33) for connecting a charging device for supplying electrical energy to the energy storage device (16).

7. The vehicle (1) as set forth in claim 1, wherein the drive train (51) comprises: one single-stage, non-tractive primary drive (52) disposed between an output shaft (48) of the drive motor (30) and an output shaft (53) of the drive unit (28).

8. The vehicle (1) as set forth in claim 7, wherein the primary drive (52) comprises a one-piece intermediate-wheel (56) featuring two toothings (57, 58), the first toothing (58) of which meshes with a gearwheel (59) of the output shaft (48) of the drive motor (30), and the second toothing (57) of which mates with a toothing (55) of the output shaft (53) of the drive unit (28).

9. The vehicle (1) as set forth in claim 7, wherein the drive unit (28) comprises a compartment (45), having a cover (37), for accommodating the drive motor (30), and wherein the output shaft (48) of the drive motor (30) is mountable by a rolling contact bearing (50) in the cover (37), and the cover (37) comprises cooling fins (38).

10. The vehicle (1) as set forth in claim 1, wherein the drive unit (28) further comprises, at least in the region of the drive motor (30) and of the drive motor controller (41), cooling fins (38, 40) extending in the longitudinal direction of the drive unit (28), and further comprises, in the region of the drive motor controller (41), vertically disposed cooling fins (43).

11. The vehicle (1) as set forth in claim 10, further comprising a support (42) for mounting a rear wheel guide (13) through which the output shaft (53) of the drive unit (28) passes, the support being disposed through the vertically disposed cooling fins (43).

12. The vehicle (1) as set forth in claim 1, wherein the drive unit (28) further comprises a support (42) for mounting a rear wheel guide (13).

13. The vehicle (1) as set forth in claim 1, wherein the drive train (51) comprises a traction means between an output shaft (53) of the drive unit (28) and a rear wheel (17).

14. The vehicle (1) as set forth in claim 1, wherein the drive motor controller (41) is disposed in the drive unit (28).

15. The vehicle (1) as set forth in claim 1, further comprising a quick-change coupling for interconnecting the energy storage device (16) and the drive unit (28), and wherein the coupling requires no tool for connecting or disconnecting the electric conducting connection between the energy storage device (16) and the drive motor (30).

16. The vehicle (1) as set forth in claim 1, wherein the drive train (51) consists of a single-stage drive (52) disposed between an output shaft (48) of the drive motor (30) and an output shaft (53) of the drive unit (28).

17. The vehicle (1) as set forth in claim 1, wherein the vehicle is a two-wheeler having a single front wheel (3) and a single rear wheel (17), and comprising:
a drive unit (28) disposed between a pair of frame profiles (11) and below an energy storage device (16); and
a steering device (6) functionally coupled to a front wheel guide (2); and wherein vertical motion of the rear wheel (17) is guided by a swing arm (13) mounted in the drive unit (28).

18. A vehicle (1) having a rider saddle (7) and a vehicle frame (10) having two frame profiles (11) spaced from each other and extending up to a steering head (5), and the vehicle (1) further comprising:
an electrically operated drive motor (30);
a drive unit (28) comprising a first housing (29) in which the drive motor (30) is located;
an electrical energy storage device (16) comprising a second housing (33);
a plug (61) or a socket (60), at a first connecting surface (32) of the first housing (29) and facing the second housing (33);
a socket (60) or a plug (61), on a second connecting surface (34) of the second housing (33), the second connecting surface (34) being complementary to the first connecting surface (32) and facing the connecting surface (32) of the first housing (29);
a drive motor controller (41);
a driving wheel; and
a drive train (51) between the drive motor (30) and the driving wheel;
wherein the energy storage device (16) is mountable between the frame profiles (11) and above the first housing (29), and wherein further the second connecting surface (34) is fittable to the first connecting surface (32) to automatically make a cableless electrically conducting connection, without freely located or accessible wiring, directly between a plug (61) and a socket (60).

19. A vehicle (1) having a rider saddle (7) and a vehicle frame (10) having two frame profiles (11) spaced from each other and extending up to a steering head (5), and the vehicle (1) further comprising:
an electrically operated drive motor (30);
an electrical energy storage device (16);
a storage device housing (33) accommodating the energy storage device (16);
a socket connector (61) or plug connector (60) at the storage device housing (33);
a drive motor controller (41);
a drive unit (28);
a drive unit housing (29) accommodating a drive motor (30);
a plug connector (60) or a socket connector (61) at the drive unit housing (29);
a driving wheel;
a drive train between the drive motor and the driving wheel; and
wherein the energy storage device (16) is mountable between the frame profiles (11) and above the drive motor (30), and wherein further the energy storage device (16) is releasably disposed on the drive unit (28) to latch the socket connector or plug connector at the storage device housing (33) directly with the plug connector or socket connector at the drive unit housing (29) to make automatically a cableless electrically conducting connection, without freely located or accessible wiring, between the energy storage device (16) and the drive unit (28).

* * * * *